United States Patent
Higaki et al.

(10) Patent No.: US 12,000,018 B2
(45) Date of Patent: *Jun. 4, 2024

(54) METHOD FOR SEPARATING COPPER FROM NICKEL AND COBALT

(71) Applicant: SUMITOMO METAL MINING CO., LTD., Tokyo (JP)

(72) Inventors: Tatsuya Higaki, Niihama (JP); Hiroshi Takenouchi, Niihama (JP); Hiroshi Kobayashi, Niihama (JP); Satoshi Asano, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 696 days.

This patent is subject to a terminal disclaimer.

(21) Appl. No.: 16/648,826

(22) PCT Filed: Sep. 11, 2018

(86) PCT No.: PCT/JP2018/033682
§ 371 (c)(1),
(2) Date: Mar. 19, 2020

(87) PCT Pub. No.: WO2019/082532
PCT Pub. Date: May 2, 2019

(65) Prior Publication Data
US 2020/0216327 A1 Jul. 9, 2020

(30) Foreign Application Priority Data
Oct. 23, 2017 (JP) ................ 2017-204696

(51) Int. Cl.
*C22B 3/44* (2006.01)
*C01G 3/12* (2006.01)
(Continued)

(52) U.S. Cl.
CPC ............. *C22B 7/007* (2013.01); *C01G 3/12* (2013.01); *C22B 3/08* (2013.01); *C22B 3/44* (2013.01);
(Continued)

(58) Field of Classification Search
CPC .................................... C22B 7/007
See application file for complete search history.

(56) References Cited

U.S. PATENT DOCUMENTS 3,793,429 A 2/1974 Queneau et al.
3,975,189 A 8/1976 Haugen
(Continued)

FOREIGN PATENT DOCUMENTS

CA 1327452 C 3/1994
CA 2360608 A1 5/2002
(Continued)

OTHER PUBLICATIONS

Espacenet machine translation of JP-2007323868-A retrieved on Mar. 6, 2022 (Year: 2007).*
(Continued)

*Primary Examiner* — Jophy S. Koshy
*Assistant Examiner* — Joshua S Carpenter
(74) *Attorney, Agent, or Firm* — Locke Lord LLP

(57) ABSTRACT

Provided is a method for separating copper from nickel and cobalt with which it is possible to selectively and efficiently separate copper, as well as nickel and cobalt, from an alloy including copper, nickel, and cobalt such as an alloy having high corrosion resistance that includes copper, nickel, and cobalt obtained by dry treatment of waste lithium ion cells. An alloy including copper, nickel, and cobalt is brought into contact with sulfuric acid in the joint presence of a sulfurizing agent, and a solid containing copper and a leachate containing nickel and cobalt are obtained.

8 Claims, 1 Drawing Sheet

(51) Int. Cl.
| | |
|---|---|
| *C22B 3/00* | (2006.01) |
| *C22B 3/08* | (2006.01) |
| *C22B 7/00* | (2006.01) |
| *C22B 15/00* | (2006.01) |
| *H01M 10/0525* | (2010.01) |
| *H01M 10/54* | (2006.01) |

(52) U.S. Cl.
CPC ........ *C22B 15/0071* (2013.01); *C22B 23/043* (2013.01); *H01M 10/0525* (2013.01); *H01M 10/54* (2013.01)

(56) References Cited

U.S. PATENT DOCUMENTS

| | | | |
|---|---|---|---|
| 4,401,630 | A | 8/1983 | Ettell et al. |
| 6,440,194 | B1* | 8/2002 | Krofchak .................. C22B 7/04 423/43 |
| 2013/0269484 | A1 | 10/2013 | Ishida et al. |
| 2013/0287621 | A1 | 10/2013 | Fujita et al. |
| 2014/0174256 | A1* | 6/2014 | Takahashi ............... C22B 1/005 75/414 |
| 2014/0322109 | A1 | 10/2014 | Nakai et al. |

FOREIGN PATENT DOCUMENTS

| | | |
|---|---|---|
| CN | 1115338 A | 1/1996 |
| CN | 1172167 A | 2/1998 |
| CN | 101285127 A | 10/2008 |
| CN | 101298638 A | 11/2008 |
| CN | 101555556 A | 10/2009 |
| CN | 104911359 A | 9/2015 |
| CN | 105063349 A | 11/2015 |
| CN | 106505272 A | 3/2017 |
| EP | 0248518 A1 | 12/1987 |
| EP | 3690068 A1 | 8/2020 |
| JP | S57-131332 A | 8/1982 |
| JP | S63-259033 A | 10/1988 |
| JP | H09-82371 A | 3/1997 |
| JP | 2007-323868 A | 12/2007 |
| JP | 2007323868 A * | 12/2007 |
| JP | 2009-097076 A | 5/2009 |
| JP | 2010-277868 A | 12/2010 |
| JP | 2012-001750 A | 1/2012 |
| JP | 2012-138301 A | 7/2012 |
| JP | 2012-172169 A | 9/2012 |
| JP | 2015-183292 A | 10/2015 |
| JP | 2016-102251 A | 6/2016 |
| KR | 10-2012-0045701 A | 5/2012 |
| WO | 2012/102384 A1 | 8/2012 |
| WO | 2013/077296 A1 | 5/2013 |

OTHER PUBLICATIONS

Buschow, K.H. et al. Encyclopedia of Materials—Science and Technology, vols. 1-11—Hydrometallurgical Principles. Elsevier. (2001). (Year: 2001).*
Dreisinger, David. "Copper leaching from primary sulfides: Options for biological and chemical extraction of copper." Hydrometallurgy 83.1-4 (2006): 10-20. (Year: 2006).*
Kang, Jingu, et al. "Preparation of cobalt oxide from concentrated cathode material of spent lithium ion batteries by hydrometallurgical method." Advanced Powder Technology 21.2 (2010): 175-179. (Year: 2010).*
International Search Report including Written Opinion issued in the International Application No. PCT/JP2018/030801 dated Oct. 30, 2018.
Office Action issued in the KR Patent Application No. KR10-2020-7006158, dated Jun. 19, 2020.
Office Action issued in the CN Patent Application No. CN201880056267.9, dated Jul. 21, 2020.
Buschow, K.H. et al. "Hydrogen-Metal Systems: Hydride Forming Alloys," Encyclopedia of Materials—Science and Technology, vols. 1-11—Hydrometallurgical Principles. Elsevier. 2001, pp. 3970-3988.
Dreisinger, David. "Copper leaching from primary sulfides: Options for biological and chemical extraction of copper," Hydrometallurgy 83, 1-4, 2006, pp. 10-20.
Office Action issued in the U.S. Appl. No. 16/648,480, dated Jun. 26, 2020.
Office Action issued in the U.S. Appl. No. 16/648,480, dated Nov. 12, 2020.
International Search Report including Written Opinion issued in the International Application No. PCT/JP2018/033683 dated Nov. 6, 2018.
International Search Report including Written Opinion issued in the International Application No. PCT/JP2018/043846 dated Jan. 29, 2019.
International Search Report dated Nov. 20, 2018, issued for PCT/JP2018/033682.
B. Friedrich et al. "Status and Trends of industrialized Li-Ion battery recycling processes with qualitative comparison of economic and environmental impacts", ICBR 2017 Lisbon, Sep. 21, 2017, pp. 1-19. (cited in the Apr. 22, 2021 Search Report issued for EP18860201.5 & cited in the May 12, 2021 Office Action issued for CA3072317).
Stefanova Vladislava et al., "Copper, Nickel and Cobalt Extraction from FeCuNiCoMn Alloy Obtained after Pyrometallurgical Processing of Deep Sea Nodules", Proceedings of the Tenth (2013) ISOPE Ocean Mining and Gas Hydrates Symposium, Sep. 22, 2013, pp. 180-184. (cited in the Apr. 22, 2021 Search Report issued for EP18860201.5 & cited in the May 11, 2021 Office Action issued for CA3077604).
J. Kang et al., "Preparation of cobalt oxide from concentrated cathode material of spent lithium ion batteries by hydrometallurgical method", Advanced Powder Technology, Elsevier BV, NL, vol. 21, No. 2, Mar. 1, 2010, pp. 175-179. (cited in the Apr. 22, 2021 Search Report issued for EP18860201.5 & cited in the Jun. 10, 2021 Search Report issued for EP18870066.0).
Extended European Search Report issued in the EP Patent Application No. 18860201.5, dated Apr. 22, 2021.
Office Action issued in the CA Patent Application No. 3077604, dated May 11, 2021.
Office Action issued in the CA Patent Application No. 3072317, dated May 12, 2021.
A. A. Palant et al., "Leaching Kinetics of the Magnetic Fraction of Converter Matte in Sulfuric Acid and Hydrochloric Acid Solutions", Russian Metallugry, vol. 2010, No. 12, Dec. 31, 2010, pp. 1110-1113. (cited in the Jun. 10, 2021 Search Report issued for EP18870066.0).
F. Huang et al., "Selective recovery of valuable metals from nickel converter slag at elevated temperature with sulfuric acid solution", Separation and Purification Technology, vol. 156, Oct. 23, 2015, pp. 572-581. (cited in the Jun. 10, 2021 Search Report issued for EP18870066.0).
Extended European Search Report issued in the EP Patent Application No. 18870066.0, dated Jun. 10, 2021.
Y. Xie et al., "Recovery of nickel, copper and cobalt from low-grade Ni—Cu sulfide tailings", Hydrometallurgy, Elsevier Scientific Publishing CY. Amsterdam, NL, vol. 80, No. 1-2, Nov. 1, 2005, pp. 54-58. (cited in the Jun. 10, 2021 Search Report issued for EP18871166.7).
Extended European Search Report issued in the EP Patent Application No. 18871166.7, dated Jun. 10, 2021.
Physics, Chemistry, Liao Hept, Liao ning Person Press, Nov. 1987, p. 165. See the nature of sulphur, See the machine translation of the CN Office Action as a concise explanation of the relevance. (cited in the Aug. 30, 2021 Office action issued for CN201880056786.5.).
Office Action dated Aug. 30, 2021, issued in the related CN Patent Application No. 201880056786.5.
Extended European Search Report mailed on Feb. 12, 2024, issued in the EP Patent Application No. 23198073.1.

* cited by examiner

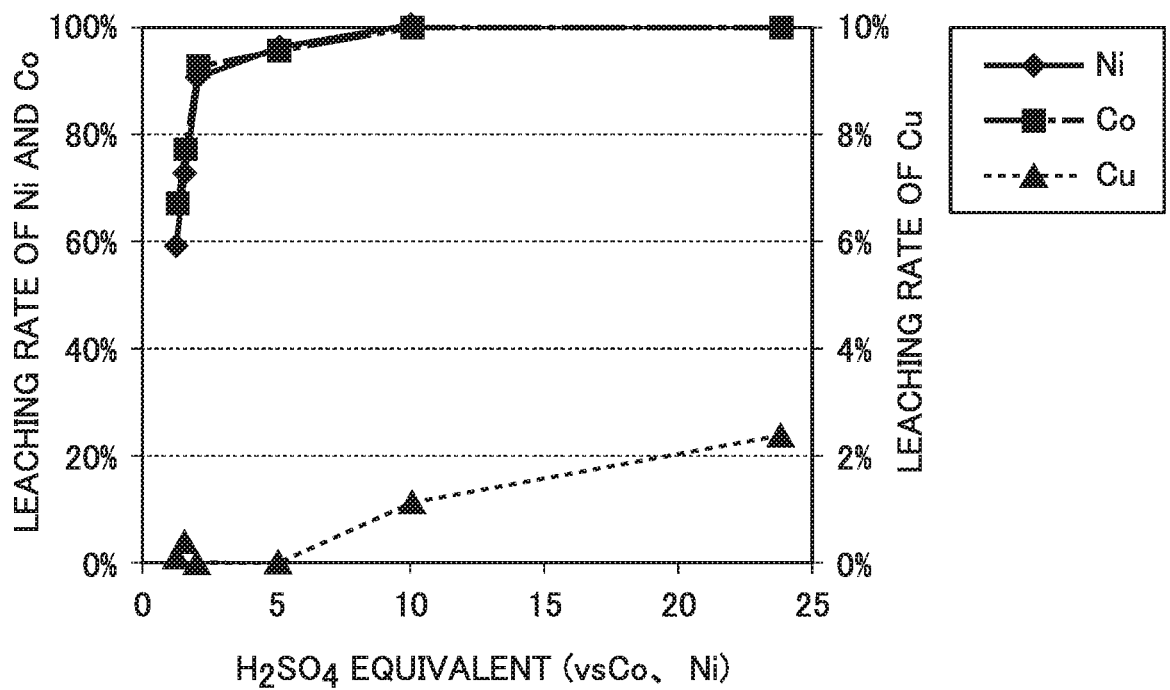

METHOD FOR SEPARATING COPPER FROM NICKEL AND COBALT

TECHNICAL FIELD

The present invention relates to a method for separating copper from nickel and cobalt, from an alloy containing copper, nickel, and cobalt.

BACKGROUND ART

A lithium ion cell (hereinafter, also referred to as "LIB") having light weight and high output is mounted on a vehicle such as an electric car or a hybrid car and an electronic device such as a mobile phone, a smart phone, or a personal computer.

The LIB has a structure in which an outer can formed of a metal such as aluminum or iron or plastic such as vinyl chloride is electric charged with a negative electrode material in which a negative electrode active material such as graphite is firmly fixed onto a surface by using a copper foil in a negative electrode collector, and a positive electrode material in which a positive electrode active material such as lithium nickelate or lithium cobaltate is firmly fixed onto a positive electrode collector formed of an aluminum foil, along with a separator formed of a porous resin film of polypropylene or the like, and an organic solvent containing an electrolyte such as lithium hexafluorsophosphate ($LiPF_6$) is impregnated as an electrolytic solution.

In a case where the LIB is used by being built in the vehicle, the electronic device, or the like described above, eventually, the LIB is not capable of being used due to the deterioration of the car, the electronic device, or the like, the lifetime of the LIB, or the like, and thus, becomes a waste lithium ion cell (a waste LIB). In addition, the waste LIB may occur as a defective product in a manufacturing process from the beginning.

In such a waste LIB, a valuable component such as nickel, cobalt, or copper is contained, and it is desirable to recover and reuse the valuable component in order for effective utilization of resources.

In the case of efficiently recovering the valuable component from a device that is generally formed of a metal, and a member or a material, a dry treatment using a dry smelting technology in which the device, and the member or the material are put into a furnace or the like and are fused at a high temperature, and are separated into a metal that is a valuable resource and a slag subjected to disposal is considered as a quick method.

For example, in Patent Document 1, a method of recovering a valuable metal by using the dry treatment is disclosed. By applying the method of Patent Document 1 to the waste LIB, it is possible to obtain a copper alloy containing nickel and cobalt.

Such a dry treatment requires energy for heating to a high temperature, but is capable of treating various impurities in a simple process, and of separating the impurities all at once. In addition, the slag to be obtained has chemically comparatively stable properties, and thus, there is no concern that an environmental problem occurs, and the slag is easily subjected to disposal.

However, in a case where the waste LIB is treated in the dry treatment, a part of the valuable component, in particular, most of cobalt is distributed to the slag, and thus, it is inevitable that a recovery loss of cobalt occurs.

In addition, a metal that is obtained in the dry treatment is an alloy in the joint presence of the valuable component, and in order for reuse, it is necessary to perform purification in which each component is separated from the alloy, and impurities are removed.

Examples of an element separating method that has been generally used in the dry method include a method of performing slow cooling from a fused state at a high temperature, and thus, for example, of separating copper and lead from each other or separating lead and zinc from each other. However, in a case where copper and nickel are a main component, as with the waste LIB, copper and nickel have properties of being homogeneously melted in the entire composition range, and thus, even in the case of performing slow cooling, copper and nickel are mixed and solidified into the shape of a layer, but are not capable of being separated.

Further, there is also purification in which nickel is subjected to a disproportionation reaction by using carbon monoxide (CO) gas, and is volatilized, and thus, is separated from copper or cobalt, but very toxic CO gas is used, and thus, it is difficult to ensure safety.

In addition, examples of a method for separating copper and nickel from each other that has been industrially performed include a method of roughly separating a mixed mat (a sulfide). In such a method, a mat containing copper and nickel is generated in a smelting process, and as with the case described above, is slowly cooled, and thus, is separated into a sulfide rich in copper and a sulfide rich in nickel. However, even in such a method, copper and nickel are only roughly separated from each other, and thus, in order to obtain nickel or copper having a high purity, a process such as separate electrolytic purification is required.

A method of using a vapor pressure difference through chloride has been also considered as the other method, but the method is a process of handling a large amount of toxic chlorine, and thus, it is difficult to say that the method is industrially suitable for device corrosion countermeasures, safety countermeasures, or the like.

In addition, the same applies to the separation between copper and cobalt and the separation between cobalt and nickel.

As described above, the separation and the purification of each element in the dry method are at a rough separation level or at a high cost, compared to a wet method.

On the other hand, in the wet treatment using a hydrometallurgical method using a method such as an acid, neutralization, or solvent extraction, the energy consumption is low, and mixed valuable components are respectively separated, and thus, can be directly recovered in a grade of a high purity.

However, in the case of treating the waste LIB by using the wet treatment, a hexafluorophosphate anion of an electrolytic solution component contained in the waste LIB is a difficult-to-treat material that is not capable of being completely decomposed even at a high temperature and a sulfuric acid of a high concentration, and is mixed into an acid solution in which a valuable component is leached. Further, the hexafluorophosphate anion is water-soluble carbonate ester, and thus, it is difficult to recover phosphorus or fluorine from an aqueous solution after the valuable resource is recovered, and it is difficult to suppress release to a public sea area or the like by a water drainage treatment.

In addition, it is not easy to obtain a solution that can be used for efficiently leaching and purifying the valuable component from the waste LIB with only an acid. It is difficult to leach the waste LIB itself, and a leaching rate of the valuable component is insufficient, or in the case of forcibly performing leaching by using an acid having strong oxidation power, a large amount of components that are not recovery target, such as aluminum, iron, or manganese, are also leached along with the valuable component, an addition amount of a neutralizing agent for treating the components or a water drainage amount to be handled increases.

Further, in a case where the pH of a liquid is adjusted in order to pass through separating means such as solvent extraction or ion exchange from an acidic leachate, or the impurities are neutralized and fixed to a precipitate, a generation amount of a neutralized precipitate also increases, and thus, there are many problems from the viewpoint of ensuring a treatment place and ensuring stability.

Further, an electric charge may remain in the waste LIB, and in a case where the treatment is performed in such a state, there is a concern that exotherm, explosion, or the like is caused, and thus, a complicated procedure such as immersion in saline water and discharge is also required.

As described above, it is not possible to say that a method of treating the waste LIB by using only the wet treatment is an advantageous method.

Therefore, an attempt has been made in which the waste LIB that is difficult to be treated by only the dry treatment or the wet treatment described above, is treated by a method in which the dry treatment and the wet treatment are combined, that is, the impurities are maximally removed by the dry treatment such as roasting the waste LIB to obtain a homogeneous treated material of the waste LIB, and the treated material is subjected to the wet treatment to be divided into the valuable component and the other components.

In the method in which the dry treatment and the wet treatment are combined, fluorine or phosphorus in the electrolytic solution is removed by being volatilized in the dry treatment, and plastics that are structural parts of the waste LIB or members of an organic material such as a separator are decomposed.

However, in the case of performing the dry treatment as described above, the recovery loss due to the distribution of cobalt contained in the waste LIB to the slag still remains as a problem.

A method is also considered in which an atmosphere, a temperature, a reduction degree, or the like in the dry treatment is adjusted, and thus, cobalt is distributed as a metal, and is reduced and melted to decrease the distribution to the slag, but in this case, the metal obtained by such a method forms a poorly-soluble corrosion-resistant alloy based on copper, containing nickel and cobalt, and even in the case of dissolving the alloy with an acid in order to separate and recover the valuable component, it is difficult to dissolve the alloy.

In addition, for example, in the case of performing acid dissolution with respect to the corrosion-resistant alloy described above by using chlorine gas, a lysate (a leachate) to be obtained contains copper at a high concentration and nickel or cobalt at a comparatively low concentration. Among them, it is not so difficult to separate nickel and cobalt by using a known method such as solvent extraction. However, it is not easy to separate a large amount of copper from nickel or cobalt easily and at a low cost.

As described above, it is difficult to efficiently separate only copper, nickel, and cobalt from the waste LIB containing various components that are not recovery targets, in addition to copper, nickel, or cobalt that is the valuable component.

Note that, the problems described above also occur in the case of separating copper, nickel, and cobalt from the waste cell containing copper, nickel, and cobalt other than the waste LIB, and also occur in the case of separating copper, nickel, and cobalt from an alloy containing copper, nickel, and cobalt derived from other than the waste cell.

Patent Document 1: Japanese Unexamined Patent Application, Publication No. 2012-172169

Patent Document 2: Japanese Unexamined Patent Application, Publication No. S63-259033

DISCLOSURE OF THE INVENTION

Problems to be Solved by the Invention

The present invention has been made in consideration of such circumstances, and an object thereof is to provide a method for separating copper from nickel and cobalt in which it is possible to efficiently and selectively separate copper from nickel and cobalt from an alloy containing copper, nickel, and cobalt such as an alloy having high corrosion resistance, containing copper, nickel, and cobalt, which is obtained by performing the dry treatment with respect to the waste lithium ion cell.

Means for Solving the Problems

The present inventors have conducted intensive studies in order to attain the object described above. As a result thereof, it has been found that an alloy containing copper, nickel, and cobalt is brought into contact with a sulfuric acid in the joint presence of a sulfurizing agent, and thus, it is possible for copper that is leached from the alloy containing copper, nickel, and cobalt to be precipitated as copper sulfide (a solid), and it is possible for nickel and cobalt that are leached to remain in a leachate, and therefore, it is possible to efficiently and selectively separate copper from nickel and cobalt, from the alloy containing copper, nickel, and cobalt, and the present invention has been completed. That is, the present invention provides the followings.

(1) The first invention of the present invention is a method for separating copper from nickel and cobalt, in which an alloy containing copper, nickel, and cobalt is brought into contact with a sulfuric acid in the joint presence of a sulfurizing agent, and a solid containing copper and a leachate containing nickel and cobalt are obtained.

(2) The second invention of the present invention is the method for separating copper from nickel and cobalt according to the first invention, in which the sulfurizing agent is one or more types selected from sulfur, hydrogen sulfide gas, sodium hydrogen sulfide, and sodium sulfide.

(3) The third invention of the present invention is the method for separating copper from nickel and cobalt according to the first invention or the second invention, in which the sulfuric acid and the sulfurizing agent are simultaneously brought into contact with the alloy containing copper, nickel, and cobalt, or the sulfurizing agent is brought into contact with the alloy, and then, the sulfuric acid is brought into contact with the alloy.

(4) The fourth invention of the present invention is the method for separating copper from nickel and cobalt according to any one of the first invention to the third invention, in which the alloy containing copper, nickel, and cobalt is an alloy that is obtained by heating and melting, and reducing scrap of a lithium ion cell.

(5) The fifth invention of the present invention is the method for separating copper from nickel and cobalt according to any one of the first invention to the fourth invention, in which the alloy containing copper, nickel, and cobalt is a powder material, and a particle diameter of the alloy containing copper, nickel, and cobalt is less than or equal to 300 μm.

(6) The sixth invention of the present invention is the method for separating copper from nickel and cobalt according to any one of the first invention to the fifth invention, in which the solid containing copper and the leachate containing nickel and cobalt are separated, and then, copper remaining in the leachate containing nickel and cobalt is removed.

(7) The seventh invention of the present invention is the method for separating copper from nickel and cobalt according to the sixth invention, in which copper remaining in the leachate containing nickel and cobalt is removed by one or more types of methods selected from sulfurizing, electrowinning, and neutralizing and precipitating.

Effects of the Invention

According to the present invention, it is possible to efficiently and selectively separate copper from nickel and cobalt, from the alloy containing copper, nickel, and cobalt, and for example, it is possible to efficiently and selectively separate nickel and cobalt from copper, from a poorly-soluble copper alloy containing nickel and cobalt that are obtained by heating and melting, and reducing a waste lithium ion cell.

Then, nickel and cobalt that are separated from the alloy by the present invention can be separated by a known method, and can be respectively effectively reused as a metal such as nickel or cobalt, or salts of a high purity. In addition, copper that is separated from the alloy is in the form of a sulfide that is suitable for copper smelting, and is directly put into a converter of a copper smelting furnace, and is subjected to electrolytic purification or the like, and thus, it is possible to recover copper of a high purity.

BRIEF DESCRIPTION OF THE DRAWINGS

FIG. 1 is a diagram illustrating a relationship between a sulfuric acid equivalent that is added and a leaching rate of copper, nickel, and cobalt, in an example in which a leaching temperature is 95° C. and a reaction time is 3 hours.

PREFERRED MODE FOR CARRYING OUT THE INVENTION

Hereinafter, an embodiment of the present invention will be described. Note that, herein, the expression of "X to Y" (X and Y are an arbitrary numerical value) indicates "greater than or equal to X and less than or equal to Y".

A method for separating copper from nickel and cobalt according to this embodiment (hereinafter, simply referred to as a "separating method") is a method for separating copper from nickel and cobalt, from an alloy containing copper, nickel, and cobalt (hereinafter, may be simply referred to as an "alloy"). Specifically, in the separating method, the alloy containing copper, nickel, and cobalt is brought into contact with a sulfuric acid in the joint presence of a sulfurizing agent, and a solid containing copper and a leachate containing nickel and cobalt are obtained.

A treatment target of the separating method according to this embodiment is the alloy containing copper, nickel, and cobalt. Examples of the alloy include an alloy obtained by heating and melting, and reducing a waste cell such as a scrap of a lithium ion cell (also referred to as a "waste lithium ion cell") that is generated in accordance with the deterioration of a car, an electronic device, or the like, or the lifetime of the lithium ion cell, that is, an alloy obtained by performing a dry treatment with respect to the waste cell. Note that, it is possible to remove components such as an organic solvent, aluminum, iron, manganese, phosphorus, fluorine, and carbon by performing the dry treatment.

In addition, the alloy obtained by heating and melting, and reducing the waste cell, for example, may be cast into the shape of a plate, and may be used as the treatment target of the separating method of this embodiment. In addition, a powder material such as an alloy powder that is obtained by applying an atomization method to a molten metal of the alloy obtained by heating and melting, and reducing the waste cell may be used as the treatment target. Note that, the atomization method is a method of obtaining a powder by bringing the molten metal into contact with gas or water of a high pressure, and by scattering and rapidly cooling (coagulating) the molten metal. In addition, a rod material that is obtained by linearly drawing out and suitably cutting the molten metal may be used as the treatment target.

In the case of the powder material, it is preferable that a particle diameter of the alloy is less than or equal to approximately 300 μm, since the alloy is easily treated. On the other hand, in a case where the particle diameter is excessively small, the cost increases, and dust or ignition is caused, and thus, it is preferable that the particle diameter of the alloy is greater than or equal to approximately 10 μm.

The alloy obtained by performing the dry treatment with respect to the lithium ion cell is a poorly-soluble copper alloy having high corrosion resistance, and in the related art, it is difficult to efficiently and selectively separate copper, nickel, and cobalt, but in the separating method according to this embodiment, it is possible to efficiently and selectively separate copper, nickel, and cobalt.

Note that, herein, the waste cell indicates not only a cell that has been used, but also a defective product or the like in a manufacturing process. In addition, it is sufficient that the treatment target includes the waste cell, and other metals or resins in addition to the waste cell may be suitably added. In this case, herein, the waste cell includes other metals or resins.

In this embodiment, such an alloy is brought into contact with the sulfuric acid in the joint presence of the sulfurizing agent. Accordingly, it is possible to precipitate copper that is leached from the alloy as copper sulfide, and to obtain the solid containing copper. On the other hand, nickel and cobalt that are leached remain in the leachate. Accordingly, as described in examples, it is possible to efficiently and selectively separate copper from nickel and cobalt. Copper is precipitated as a sulfide, and thus, it is possible for copper to hardly exist in the leachate, and it is possible for nickel and cobalt to exist in an acidic solution (the leachate) at an extremely high ratio. Therefore, according to the present invention, selectivity is extremely high, and thus, it is possible to separate copper from nickel and cobalt.

A reaction that occurs by bringing the sulfurizing agent and the sulfuric acid into contact with the alloy is represented by the following reaction formulas. In the following formulas, an example is represented in which solid sulfur (S) is used as the sulfurizing agent. As represented in the following formulas, the reaction occurs by bringing the alloy into contact with the sulfurizing agent, and thus, a sulfide of leached copper is generated. In addition, nickel or cobalt is leached by the sulfuric acid, and exists in the leachate as an ion. Note that, even in a case where leached nickel or cobalt reacts with the sulfurizing agent, and thus, the sulfide is generated, there is the sulfuric acid, and thus, a sulfide of nickel or cobalt is decomposed, and nickel or cobalt exists in the leachate.

Reaction Formulas $$Cu+S \rightarrow CuS \quad (1)$$

$$Ni+H_2SO_4 \rightarrow NiSO_4+H_2 \quad (2)$$

$$NiS+H_2SO_4 \rightarrow NiSO_4+H_2S \quad (2)'$$

$$Co+H_2SO_4 \rightarrow CoSO_4+H_2 \quad (3)$$

$$CoS+H_2SO_4 \rightarrow CoSO_4+H_2S \quad (3)'$$

Elemental sulfur can be used as the sulfurizing agent, and a liquid sulfurizing agent or a gas sulfurizing agent such as sodium hydrogen sulfide (sodium hydride sulfide), sodium sulfide, and hydrogen sulfide gas may be used.

It is preferable that an oxidant such as oxygen, air, and hydrogen peroxide is added, since the leaching is prompted.

The amount of sulfuric acid that is brought into contact with the alloy, for example, is greater than or equal to 1 equivalent that is obtained by Formulas (2) and (3) described above, is preferably greater than or equal to 1.2 equivalents, is more preferably greater than or equal to 1.2 equivalents and less than or equal to 24 equivalents, and is even more preferably greater than or equal to 1.2 equivalents and less than or equal to 11 equivalents, with respect to the total amount of nickel and cobalt contained in the alloy. Note that, it is possible to increase a reaction rate by increasing an acid concentration.

In addition, it is preferable that the amount of sulfurizing agent is greater than or equal to 1 equivalent that is obtained by Formula (1) described above, with respect to the amount of copper contained in the alloy.

A slurry concentration that is obtained by adding the sulfuric acid and the sulfurizing agent to the alloy, that is, a ratio of the mass of the alloy to the volume of a slurry (Mass of Alloy Containing Copper, Nickel, and Cobalt/Volume of Slurry) is preferably greater than or equal to 20 g/l.

A reaction temperature, for example, is higher than or equal to 50° C., is preferably higher than or equal to 75° C., and is more preferably higher than or equal to 95° C., and it is preferable that such a temperature is maintained during the reaction. In a case where the reaction temperature is higher than or equal to 95° C., for example, it is possible to remarkably increase the reaction rate, compared to a case where the reaction is performed at a reaction temperature of lower than 75° C. In addition, a reaction time, for example, is 1 hour to 6 hours.

Note that, it is preferable that the sulfuric acid and the sulfurizing agent are simultaneously brought into contact with the alloy, or the sulfurizing agent is brought into contact with the alloy first, and then, the sulfuric acid is brought into contact with the alloy. In a case where the sulfuric acid is brought into contact with the alloy, in a state where there is no sulfurizing agent, as with the related art, a leaching rate of a valuable component is insufficient, and a part of a component that contained in the alloy but is not a recovery target, such as iron, may be also leached, and a load in the subsequent purification process increases.

A method of bringing the sulfuric acid or the sulfurizing agent into contact with the alloy is not particularly limited, and for example, the alloy or the sulfurizing agent may be added to the sulfuric acid, and may be mixed, and as necessary, may be stirred. In addition, in order to bring the sulfurizing agent into contact with the alloy, a solid sulfurizing agent may be contained in or applied to the alloy in the dry treatment.

According to this embodiment, it is possible to separate copper from nickel and cobalt, but it is not preferable that a part of copper that is leached from the alloy remains in the leachate, and copper is directly emitted from a leaching facility or the like, since a load in a process of separating nickel and cobalt increases.

For this reason, a copper removal facility for removing copper that remains in the leachate may be provided in an outlet of a reaction bath in which the separating method of this embodiment is performed, copper removal may be completely performed, and the leachate may be supplied to the process of separating nickel and cobalt. Examples of a method of removing copper that remains in the leachate include adding the sulfurizing agent, electrowinning, generating a neutralized precipitate by adding a neutralizing agent, and the like.

As described above, according to the method for separating copper from nickel and cobalt, of this embodiment, it is possible to form a leaching residue as the copper sulfide by sulfurizing copper in the alloy containing copper, nickel, and cobalt, and to efficiently and selectively separate nickel and cobalt that remain in the leachate.

Note that, the copper sulfide obtained by the method for separating copper from nickel and cobalt, of this embodiment is directly supplied as a raw material of a known copper smelting process, and thus, it is possible to obtain an anode, and to obtain copper of a high purity by performing electrolytic purification with respect to the anode.

In addition, nickel and cobalt leached in the leachate are supplied to a known nickel smelting process, and thus, it is possible to obtain a nickel metal or a cobalt metal by separating and electrowinning nickel and cobalt with solvent extraction or the like, or it is possible to purify nickel and cobalt as a nickel salt or a cobalt salt to be recycled as a raw material of the lithium ion cell.

EXAMPLES

Hereinafter, the present invention will be described in more detail by examples, but the present invention is not limited to the following examples.

Examples 1 to 18

A waste lithium ion cell (a waste LIB) was subjected to a dry treatment in which heating and melting, and reducing were performed, a molten metal of an alloy containing copper, nickel, and cobalt was obtained, the molten metal flowed into a small crucible having a hole in a bottom surface, gas or water of a high pressure was sprayed to the molten metal flowing out of the hole, and the molten metal was scattered and coagulated, and was sieved, and thus, an alloy powder having a particle diameter of less than or equal to 300 μm (hereinafter, the alloy powder is also conveniently referred to as an "atomized powder") was obtained. Results of analyzing the obtained alloy powder by using an ICP analysis device are shown in Table 1.

Next, 1.0 g of the alloy powder described above was sampled in each of the examples. In addition, in each of the examples, 0.35 g of elemental sulfur (a sulfur solid) that was 1 equivalent for forming the copper sulfide represented by Formula (1) described above with respect to a copper grade in the alloy powder was prepared.

In addition, in each of the examples, the amount of sulfuric acid of 1.2 equivalents to 23.8 equivalents calculated by Formula (2) and Formula (3) described above was separated with respect to the total amount of nickel and cobalt contained in the alloy powder, and the sulfuric acid was diluted to 50 ml.

Each sulfuric acid was subjected to temperature rising from 75° C. to 95° C., and 1.0 g of each alloy powder and 0.35 g of each sulfur were simultaneously added, and were stirred for 0.5 hours to 6 hours. After the stirring was performed for each time, solid-liquid separation was performed by filtration, a filtrate was analyzed by using an ICP analysis device, and the concentration of each component of copper, nickel, cobalt, iron, and sulfur was obtained. Note that, in Examples 1, 6, and 10 to 12, the stirring was performed at the number of rotations of 200 rpm, and in the other examples, the stirring was performed at the number of rotations of 400 rpm. The leaching conditions described above and ICP measurement results of each of the examples are shown in Table 2. In Table 2, a stirring time is represented as "Time", and a rising temperature is represented as "Temperature". Results of measuring the mass of a filtration residue, and a liquid amount after the filtration, pH, and an oxidation-reduction potential ORP (based on Silver/Silver Chloride Electrode) are also shown in Table 2. In addition, results of obtaining a leaching rate of each element of copper, nickel, cobalt, and iron are shown in Table 3. The leaching rate was obtained by dividing the mass of a target element in the filtrate by the mass of the target element in the atomized powder. In addition, a relationship between a sulfuric acid equivalent that is added and a leaching rate of copper, nickel, and cobalt, in an example in which a leaching temperature was 95° C. and a reaction time was 3 hours is illustrated in FIG. 1.

As shown in Tables 2 and 3, and FIG. 1, in Examples 1 to 18, even in a case where the reaction temperature, the amount of sulfuric acid, and the reaction time were changed, the leaching rate of copper was suppressed to be less than or equal to 2.3%, and was suppressed to be less than 1%, in accordance with the reaction temperature, the amount of sulfuric acid, and the reaction time. On the other hand, the leaching rate of nickel, cobalt, and iron was considerably higher than the leaching rate of copper in each of the examples, and was greater than or equal to 90%, in accordance with the reaction temperature, the amount of sulfuric acid, and the reaction time. From such results, it was found that the alloy containing copper, nickel, and cobalt was brought into contact with the sulfuric acid in the joint presence of a sulfurizing agent, and thus, copper was precipitated as the copper sulfide, nickel and cobalt were selectively leached in the leachate, and copper was capable of being efficiently and selectively separated from nickel and cobalt, from the alloy.

TABLE 1

| | ICP analysis value (%) | | | | | |
|---|---|---|---|---|---|---|
| | Cu | Ni | Co | Fe | Mn | S |
| Atomized powder | 76% | 12% | 12% | 1.5% | 0.06% | <0.1% |

TABLE 2

| | Atomized powder (g) | H$_2$SO$_4$ (64%) Equivalent (vsCo, Ni) | Liquid amount (ml) | S Equivalent (vsCu) | Amount (g) | Time (hr) | Temperature (° c.) | Residue (g) |
|---|---|---|---|---|---|---|---|---|
| Example 1 | 1.0 | 23.8 | 10.2 | 1 | 0.35 | 2.5 | 75 | 1.15 |
| Example 2 | 1.0 | 23.8 | 10.2 | 1 | 0.35 | 3 | 95 | 1.00 |
| Example 3 | 1.0 | 5 | 2.1 | 1 | 0.35 | 3 | 95 | 0.99 |
| Example 4 | 1.0 | 10 | 4.2 | 1 | 0.35 | 3 | 95 | 0.95 |
| Example 5 | 1.0 | 2 | 0.84 | 1 | 0.35 | 3 | 95 | 1.02 |
| Example 6 | 1.0 | 5 | 2.1 | 1 | 0.35 | 3 | 95 | 0.99 |
| Example 7 | 1.0 | 5 | 2.1 | 1 | 0.35 | 0.5 | 95 | — |
| Example 8 | 1.0 | 5 | 2.1 | 1 | 0.35 | 1 | 95 | — |
| Example 9 | 1.0 | 5 | 2.1 | 1 | 0.35 | 2 | 95 | 1.03 |
| Example 10 | 1.0 | 5 | 2.1 | 1 | 0.35 | 0.5 | 95 | — |
| Example 11 | 1.0 | 5 | 2.1 | 1 | 0.35 | 1 | 95 | — |
| Example 12 | 1.0 | 5 | 2.1 | 1 | 0.35 | 2 | 95 | 0.96 |
| Example 13 | 1.0 | 1.5 | 0.63 | 1 | 0.35 | 3 | 95 | — |
| Example 14 | 1.0 | 1.5 | 0.63 | 1 | 0.35 | 6 | 95 | 1.02 |
| Example 15 | 1.0 | 1.2 | 0.5 | 1 | 0.35 | 3 | 95 | — |
| Example 16 | 1.0 | 1.2 | 0.5 | 1 | 0.35 | 6 | 95 | 1.10 |
| Example 17 | 1.0 | 2 | 0.84 | 1 | 0.35 | 1 | 95 | — |
| Example 18 | 1.0 | 2 | 0.84 | 1 | 0.35 | 6 | 95 | 0.99 |
| Comparative Example 1 | 1.1 | 23.8 | 10.2 | — | — | 4 | 75 | — |
| Comparative Example 2 | 0.17 | 70 | 5 | — | — | 4 | 75 | — |

| | After filtration | | | Filtrate: ICP analysis value (g/l) | | | | |
|---|---|---|---|---|---|---|---|---|
| | Liquid amount (ml) | pH | ORP (mV) | Cu | Ni | Co | Fe | S |
| Example 1 | 46 | −0.38 | 94 | 0.007 | 1.46 | 1.52 | 0.18 | 64.5 |
| Example 2 | 46 | −0.42 | 368 | 0.38 | 2.60 | 2.60 | 0.32 | 64.1 |

TABLE 2-continued

| | | | | | | | | |
|---|---|---|---|---|---|---|---|---|
| Example 3 | 50 | 0.59 | 181 | 0.0001 | 2.35 | 2.34 | 0.28 | 12.8 |
| Example 4 | 46 | 0.19 | 333 | 0.17 | 2.62 | 2.59 | 0.31 | 26.7 |
| Example 5 | 45 | 1.13 | 265 | 0.001 | 2.35 | 2.39 | 0.30 | 5.47 |
| Example 6 | 45 | 0.54 | 312 | 0.020 | 2.63 | 2.62 | 0.32 | 13.4 |
| Example 7 | 47.5 | — | — | 0.001 | 1.72 | 1.70 | 0.21 | 14.8 |
| Example 8 | 47.5 | — | — | 0.001 | 1.88 | 1.89 | 0.23 | 12.4 |
| Example 9 | 47.5 | 0.61 | 275 | 0.002 | 2.43 | 2.43 | 0.29 | 12.6 |
| Example 10 | 47 | — | — | 0.001 | 1.56 | 1.55 | 0.20 | 15.3 |
| Example 11 | 47 | — | — | 0.003 | 1.85 | 1.80 | 0.22 | 12.5 |
| Example 12 | 47 | 0.59 | 182 | 0.002 | 2.47 | 2.41 | 0.29 | 12.8 |
| Example 13 | 47 | — | — | 0.059 | 1.85 | 1.97 | 0.26 | 4.21 |
| Example 14 | 49.5 | 1.56 | 339 | 0.12 | 2.07 | 2.13 | 0.28 | 4.01 |
| Example 15 | 46 | — | — | 0.019 | 1.54 | 1.75 | 0.26 | 3.4 |
| Example 16 | 46 | 1.64 | 306 | 0.001 | 1.86 | 1.98 | 0.28 | 3.18 |
| Example 17 | 50 | — | — | 0.009 | 1.25 | 1.29 | 0.16 | 4.36 |
| Example 18 | 47 | 1.3 | 350 | 0.370 | 2.45 | 2.47 | 0.3 | 5.13 |
| Comparative Example 1 | 50 | −0.36 | 562 | 0.51 | 0.16 | 0.17 | 0.027 | — |
| Comparative Example 2 | 20 | — | >1000 | 6.7 | 1.0 | 1.1 | 0.13 | — |

TABLE 3

| | Leaching rate (filtrate/atomized powder) | | | |
|---|---|---|---|---|
| | Cu | Ni | Co | Fe |
| Example 1 | 0.0% | 56% | 58% | 55% |
| Example 2 | 2.3% | 100% | 100% | 98% |
| Example 3 | 0.0% | 98% | 98% | 93% |
| Example 4 | 1.0% | 100% | 99% | 95% |
| Example 5 | 0.0% | 88% | 90% | 90% |
| Example 6 | 0.1% | 99% | 98% | 96% |
| Example 7 | 0.0% | 68% | 67% | 67% |
| Example 8 | 0.0% | 74% | 75% | 73% |
| Example 9 | 0.0% | 96% | 96% | 92% |
| Example 10 | 0.0% | 61% | 61% | 63% |
| Example 11 | 0.0% | 72% | 71% | 69% |
| Example 12 | 0.0% | 97% | 94% | 91% |
| Example 13 | 0.4% | 73% | 77% | 82% |
| Example 14 | 0.8% | 85% | 88% | 92% |
| Example 15 | 0.1% | 59% | 67% | 80% |
| Example 16 | 0.0% | 71% | 76% | 86% |
| Example 17 | 0.1% | 52% | 54% | 53% |
| Example 18 | 2.3% | 96% | 97% | 94% |
| Comparative Example 1 | 3% | 6% | 6% | 8% |
| Comparative Example 2 | 100% | 98% | 100% | 100% |

Comparative Example 1

1.1 g of an alloy powder having a particle diameter of less than or equal to 300 μm that was obtained as with Example 1 was sampled. Next, a solution was prepared in which a sulfuric acid of 23.8 equivalents was separated with respect to the total amount of nickel and cobalt contained in the alloy powder, and was diluted to 50 ml, and the solution was subjected to temperature rising to 75° C.

Next, the alloy powder described above was added, and was stirred at the number of rotations of 400 rpm for 4 hours. At this time, a sulfurizing agent was not added. After that, solid-liquid separation was performed by filtration, a filtrate was analyzed by using an ICP analysis device, and the concentration of each component of copper, nickel, cobalt, iron, and sulfur was obtained. The leaching conditions described above and ICP measurement results are shown in Table 2. Results of measuring a liquid amount after the filtration, pH, and an ORP are also shown in Table 2. In addition, results of obtaining a leaching rate of each element of copper, nickel, cobalt, and iron are shown in Table 3.

Comparative Example 2

0.17 g of an alloy powder having a particle diameter of less than or equal to 300 μm that was obtained as with Example 1 was sampled. Next, a solution was prepared in which a sulfuric acid of 70 equivalents was separated with respect to the total amount of nickel and cobalt contained in the alloy powder, and was diluted to 20 ml, and the solution was subjected to temperature rising to 75° C.

Next, the alloy powder described above was added, and was stirred at the number of rotations of 400 rpm for 4 hours. Note that, Na sulfate was added to the solution being dissolved by the sulfuric acid of 70 equivalents until the ORP was greater than or equal to 1000 mV. After that, solid-liquid separation was performed by filtration, a filtrate was analyzed by using an ICP analysis device, and the concentration of each component of copper, nickel, cobalt, iron, and sulfur was obtained. The leaching conditions described above and ICP measurement results are shown in Table 2. Results of measuring a liquid amount after the filtration and an ORP are also shown in Table 2. In addition, results of obtaining a leaching rate of each element of copper, nickel, cobalt, and iron are shown in Table 3.

As shown in Tables 2 and 3, even in Comparative Example 1 in which Na sulfate was added, it was found that the leaching rate of copper, nickel, cobalt, and iron was approximately 5%, and leaching was performed without selectivity. In addition, in Comparative Example 2 in which Na sulfate that was an oxidant, but not the sulfurizing agent, was added, it was found that approximately the total amount of copper, nickel, cobalt, and iron was dissolved, and the leaching was performed without the selectivity. As described above, in Comparative Examples 1 and 2 in which the sulfurizing agent was not added, it was found that the leaching was performed without the selectivity, and it was difficult to separate copper from nickel and cobalt.

The invention claimed is:
1. A method for separating copper from nickel and cobalt, the method comprising:
   producing an alloy containing copper metal, nickel metal, and cobalt metal in the form of an alloy powder;
   adding a sulfurization agent to the alloy powder to establish a joint presence of the sulfurization agent and the alloy powder;

wherein the sulfurization agent is one or more selected from the group consisting of elemental sulfur, hydrogen sulfide gas, sodium hydrogen sulfide and sodium sulfide; and bringing the alloy powder into contact with sulfuric acid in the joint presence, whereby the nickel metal and the cobalt metal are leached from the alloy powder and the copper metal contained in the alloy powder is sulfurized by the sulfurization agent to obtain a solid containing copper sulfide and a leachate containing the nickel existing as an ion and the cobalt existing as an ion.

2. The method for separating copper from nickel and cobalt according to claim 1, wherein the alloy containing copper metal, nickel metal, and cobalt metal obtained by heating and melting, and reducing a waste lithium ion cell.

3. The method for separating copper from nickel and cobalt according to claim 1, wherein the alloy power has a particle diameter of less than or equal to 300 μm.

4. The method for separating copper from nickel and cobalt according to claim 1, wherein the solid containing the copper sulfide and the leachate containing the nickel existing as an ion and the cobalt existing as an ion are separated, and then, copper remaining in the leachate containing nickel and cobalt is removed.

5. The method for separating copper from nickel and cobalt according to claim 2, wherein the alloy power has a particle diameter of less than or equal to 300 μm.

6. The method for separating copper from nickel and cobalt according to claim 2, wherein the solid containing the copper sulfide and the leachate containing the nickel existing as an ion and the cobalt existing as an ion are separated, and then, copper remaining in the leachate containing nickel and cobalt is removed.

7. The method for separating copper from nickel and cobalt according to claim 3, wherein the solid containing the copper sulfide and the leachate containing the nickel existing as an ion and the cobalt existing as an ion are separated, and then, copper remaining in the leachate containing nickel and cobalt is removed.

8. The method for separating copper from nickel and cobalt according to claim 4, wherein copper remaining in the leachate containing nickel and cobalt is removed by one or more types of methods selected from sulfurizing, electrowinning, and neutralizing and precipitating.

* * * * *